US012737650B1

(12) United States Patent
Bonanno, Jr. et al.

(10) Patent No.: US 12,737,650 B1
(45) Date of Patent: Sep. 15, 2026

(54) CONSTRAINED OUTPUT GENERATION FOR LARGE LANGUAGE MODELS

(71) Applicant: Citibank, N.A., New York, NY (US)

(72) Inventors: Joseph V Bonanno, Jr., Scarsdale, NY (US); Satchel Aviram, Brooklyn, NY (US); Vasanthakumar Rajendran, Bridgewater, NJ (US); Karolina Belwal, Weehawken, NJ (US); Rachit Kumar, Fair Lawn, NJ (US); James Randolph Myers, Clearwater Beach, FL (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/635,748

(22) Filed: Mar. 31, 2026

(51) Int. Cl.
*G06N 5/025* (2023.01)

(52) U.S. Cl.
CPC .................................. *G06N 5/025* (2013.01)

(58) Field of Classification Search
None
See application file for complete search history.

(56) References Cited

U.S. PATENT DOCUMENTS 10,042,928 B1 * 8/2018 Brown .................... G06F 16/00
2012/0233152 A1 * 9/2012 Vanderwende ....... G06F 16/382 707/769
2022/0392420 A1 * 12/2022 Harwell ................... G09G 5/06
2025/0371387 A1 * 12/2025 Wei .................. G06F 16/33295
2025/0384216 A1 * 12/2025 Nallam .................. G06F 40/35
2026/0133812 A1 * 5/2026 Subramaniyan ........ G06F 9/451

* cited by examiner

*Primary Examiner* — David E Choi
(74) *Attorney, Agent, or Firm* — Perkins Coie LLP; Sumedha Ahuja; Alice Jenkins

(57) ABSTRACT

Systems, methods, and devices for generating constrained outputs for large language models are disclosed. The system receives an input query relating to a request from a user via a user interface associated with an entity. The system retrieves knowledge elements from a proprietary knowledge corpus, including frameworks, methodologies, or constraints specific to the entity. For each knowledge element, the system inputs the query and knowledge element into a large language model to generate a preliminary output. The system applies user-specific rules to generate a constrained output by parsing the preliminary output, evaluating response components against user-specific constraints as logical predicates, and modifying components that violate rules. The system generates citations linking outputs to source identifiers, aggregates the constrained outputs and citations to generate a composite response, and transmits it to the user interface.

20 Claims, 7 Drawing Sheets

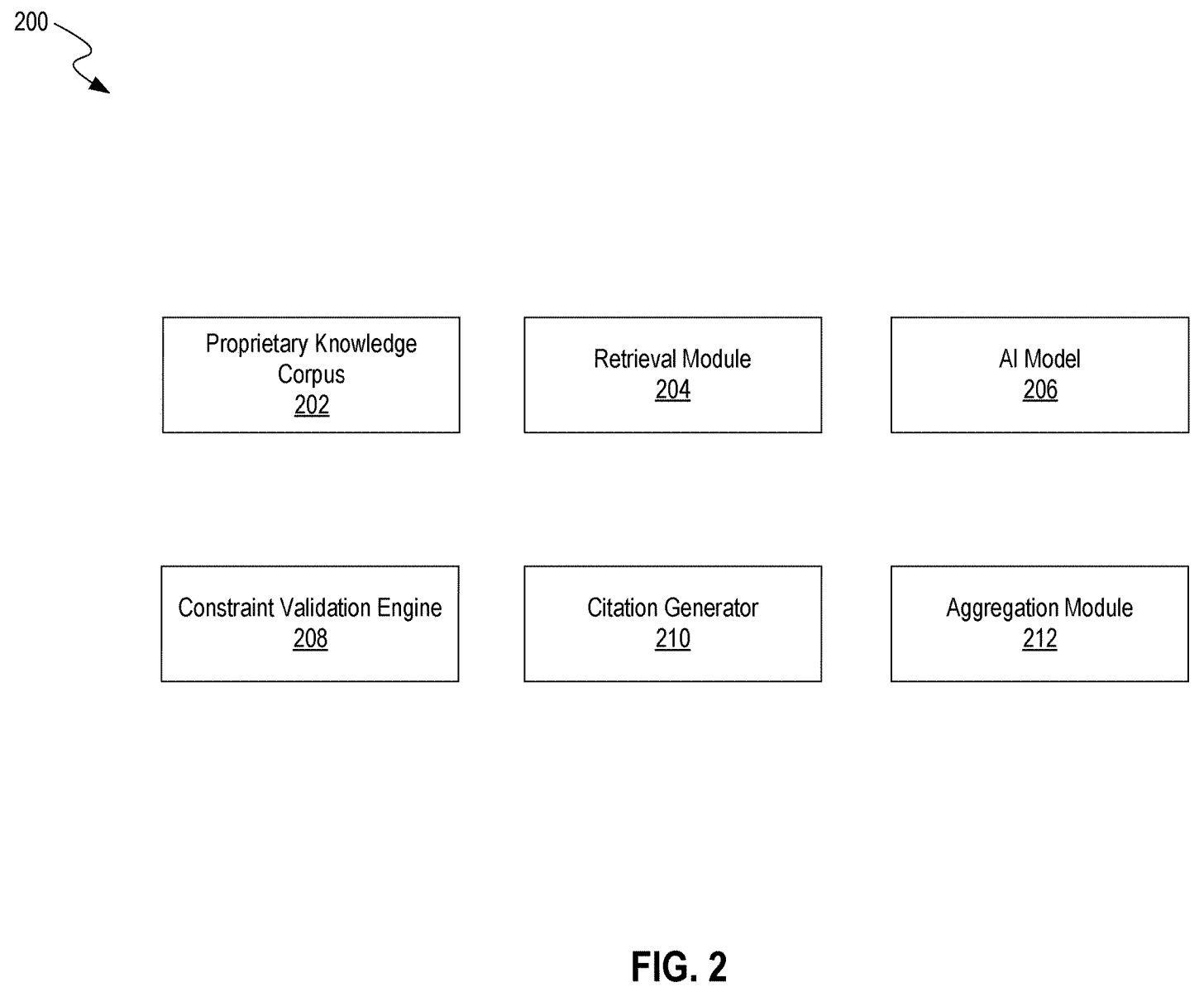

200

Proprietary Knowledge Corpus 202

Retrieval Module 204

AI Model 206

Constraint Validation Engine 208

Citation Generator 210

Aggregation Module 212

FIG. 2

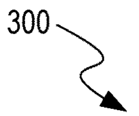
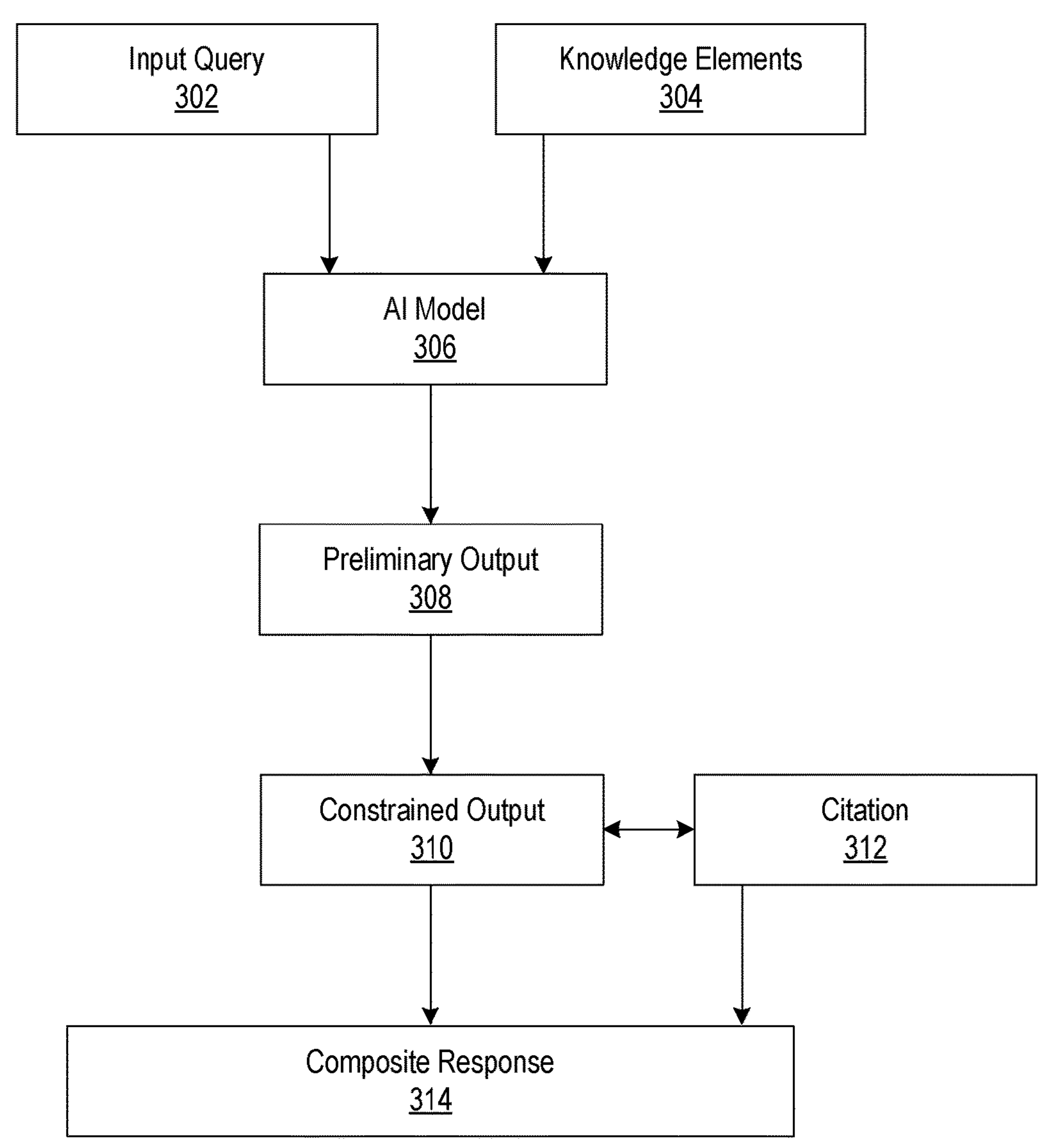
FIG. 3

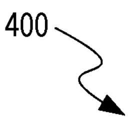

402
Receive an input query relating to a request

404
Retrieve, from a proprietary knowledge corpus, a plurality of knowledge elements responsive to the input query 406
Input, into an AI model, the input query and each knowledge element to generate a preliminary output 408
Apply one or more rules to each preliminary output to generate a constrained output 410
Generate a citation linking each constrained output to a source identifier associated with the knowledge element 412
Aggregate each constrained output and each citation for each knowledge element of the plurality of knowledge elements to generate a composite response 414
Transmit the composite response and a plurality of citations corresponding to the plurality of knowledge elements

FIG. 4

CONSTRAINED OUTPUT GENERATION FOR LARGE LANGUAGE MODELS

BACKGROUND

Large language models (LLMs) are artificial intelligence systems trained on extensive text corpora to generate human-like text responses. These models utilize deep learning architectures, particularly transformer networks, to process input sequences and produce contextually relevant outputs. LLMs can perform various natural language processing tasks including text generation, summarization, translation, and question answering. The models learn statistical patterns from training data and apply these patterns to generate responses to novel inputs.

SUMMARY

As organizations increasingly deploy artificial intelligence systems to generate responses, a technical challenge arises in grounding such outputs in organization-specific knowledge rather than generic information derived from general training data. Conventional AI systems, including large language models, generate outputs based on patterns learned during training on broad datasets. These systems lack mechanisms to incorporate proprietary frameworks, methodologies, and constraints that reflect an organization's particular approaches and requirements. As a result, responses produced by such systems can be disconnected from the specific knowledge base and operational guidelines that an organization has developed over time.

This disconnect presents several technical difficulties. First, conventional systems cannot dynamically retrieve and incorporate organization-specific knowledge elements when generating outputs. Second, these systems lack the ability to apply deterministic constraint enforcement through rule-based policy evaluation and repair mechanisms that enforce compliance with user-specific or organization-specific requirements. Third, conventional approaches do not provide mechanisms for tracing generated outputs back to specific source materials, making it difficult to explain or audit the basis for particular responses. Fourth, as organizational knowledge evolves through new research, updated guidelines, or regulatory changes, conventional systems cannot integrate these updates into their reasoning processes without retraining, nor can they maintain versioned corpora with audit trails that enable reproducibility where the same inputs yield the same cited sources and version.

The disclosed system addresses these technical challenges through a retrieval-augmented approach that grounds AI-generated outputs in a proprietary knowledge corpus. The system retrieves relevant knowledge elements in response to input queries and uses these elements to constrain and inform the generation of responses. By applying deterministic constraint enforcement through rule-based policy evaluation to preliminary outputs generated by an AI model, the system enforces compliance with specified constraints while preserving compliant portions of the output and repairing non-compliant responses. The system further generates citations that link each portion of the output to specific source identifiers, enabling traceability and explainability. Additionally, the system supports continuous updates to the knowledge corpus while maintaining audit trails that enable reproducibility, ensuring that the same inputs produce the same cited sources and versions for compliance purposes.

In particular, the system can receive, via a user interface associated with an entity, an input query relating to a request from a user. For example, the input query can be submitted through a web interface, application interface, or other input mechanism associated with the entity. The system retrieves, from a proprietary knowledge corpus stored in a database, a plurality of knowledge elements responsive to the input query. The plurality of knowledge elements includes one or more of frameworks, methodologies, or constraints. The plurality of knowledge elements is specific to the entity. In some implementations, the knowledge corpus can include structured documents, research materials, operational guidelines, or other information that reflects the entity's particular approaches.

For each knowledge element of the plurality of knowledge elements, the system inputs, into a large language model, the input query and the knowledge element to generate a preliminary output. The preliminary output is based on the knowledge element. Thus, the large language model generates outputs that are informed by the specific knowledge element rather than relying solely on general training data. The system applies one or more user-specific rules to the preliminary output to generate a constrained output. The one or more user-specific rules enforce compliance with user-specific constraints and user-specific preferences. In particular, applying the rules involves parsing the preliminary output to identify one or more response components, evaluating each response component against the user-specific constraints and the user-specific preferences as logical predicates, and modifying at least one response component that violates at least one user-specific rule while preserving compliant response components. This rule-based constraint mechanism ensures that the final output conforms to applicable requirements while retaining portions that already comply.

Moreover, the system generates a citation linking the constrained output to a source identifier associated with the knowledge element. This citation mechanism enables traceability between generated outputs and their underlying sources. The system aggregates the constrained output and the citation for each knowledge element of the plurality of knowledge elements to generate a composite response. The system transmits, to the user interface, the composite response and a plurality of citations corresponding to the plurality of knowledge elements.

In some implementations, retrieving the plurality of knowledge elements involves generating a vector representation of the input query, comparing the vector representation to a plurality of stored vector representations corresponding to the plurality of knowledge elements, and selecting the plurality of knowledge elements based on a similarity threshold. This vector-based retrieval approach enables semantic matching between queries and knowledge elements.

In some implementations, the proprietary knowledge corpus includes a knowledge graph representing relationships between the one or more of the frameworks, the methodologies, or the constraints. Retrieving the plurality of knowledge elements can involve traversing the knowledge graph to identify connected nodes representing related frameworks, methodologies, or constraints. The system can use the relationships represented in the knowledge graph to determine contextual relevance of each knowledge element to the input query.

In some implementations, the one or more user-specific rules are stored in a rules database associated with the user. The system can maintain an audit trail linking the constrained output to a version of the knowledge element from which the constrained output was derived. The system can update the proprietary knowledge corpus, and updating the proprietary knowledge corpus can involve maintaining a history of changes to the plurality of knowledge elements for regulatory compliance.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF FIGURES

FIG. 2 illustrates system components for a constrained output generation system, in accordance with one or more implementations of this disclosure.

FIG. 3 illustrates a process for generating a composite response, in accordance with one or more implementations of this disclosure.

FIG. 4 illustrates a flowchart of a process for generating a composite response, in accordance with one or more implementations of this disclosure.

Figure 1:
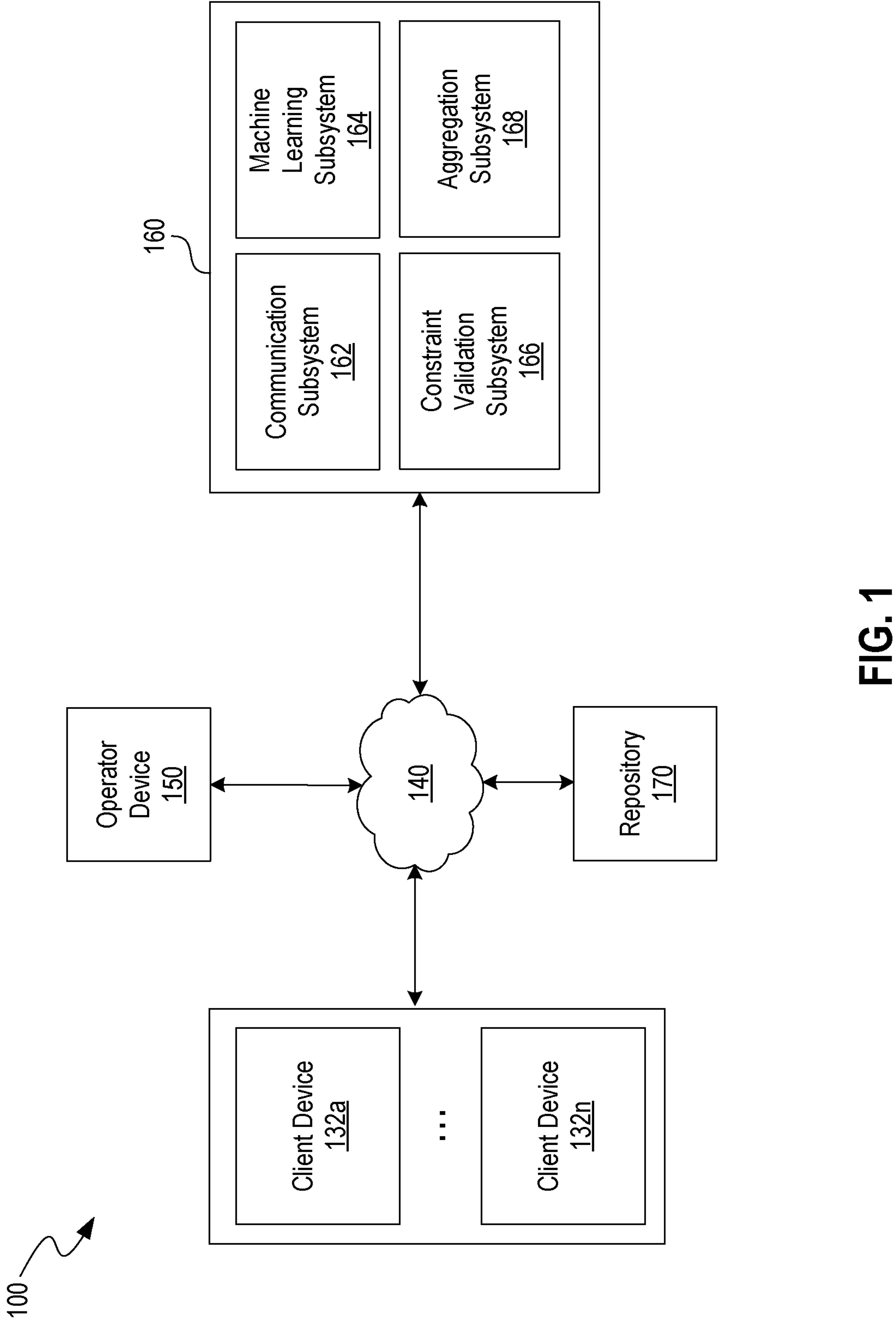
FIG. 1 shows an illustrative system for constrained output generation for large language models, in accordance with one or more implementations of this disclosure.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the disclosed implementations. It will be appreciated, however, by those having skill in the art, that the implementations can be practiced without these specific details or with an equivalent arrangement. In other cases, well-known models and devices are shown in block diagram form in order to avoid unnecessarily obscuring the disclosed implementations. It should also be noted that the methods and systems disclosed herein are also suitable for applications unrelated to constrained output generation.

FIG. 1 shows an illustrative system 100 for constrained output generation for large language models, in accordance with one or more implementations of this disclosure. For example, the illustrative system 100 can be used to retrieve knowledge elements from a proprietary knowledge corpus and generate constrained outputs based on user-specific rules. In some implementations, the illustrative system 100 can utilize techniques such as vector-based retrieval, rule-based constraint enforcement, and citation generation in order to perform comprehensive constrained output generation. For example, the illustrative system 100 can include a response system 160 that is able to perform comprehensive constrained output generation operations. The response system 160 can include software, hardware, or a combination of the two. For example, the response system 160 can be a physical server or a virtual server that is running on a physical computer system. In some implementations, the response system 160 can be configured on a user device (e.g., a laptop computer, a smartphone, a desktop computer, an electronic tablet, or another suitable user device) and configured to execute instructions for generating constrained outputs using large language models and user-specific rule enforcement. In particular, the response system 160 can include several subsystems, each configured to perform one or more steps of the methods described herein, such as a communication subsystem 162, a machine learning subsystem 164, a constraint validation subsystem 166, and an aggregation subsystem 168.

As described herein, the response system 160 can obtain data to determine the appropriate constrained outputs for responses. The response system 160 can retrieve data or sources of data from databases or data stores. In some implementations, the response system 160 can retrieve data or sources of data from a proprietary knowledge corpus 170, discussed in greater detail below. As described herein, a response system can be any system (e.g., computer, device, node, etc.) that is enabled to execute one or more tools for generating constrained outputs or enabled to execute tasks for which knowledge elements can be retrieved. The response system 160 can be configured to receive the data via a communication network 140 at the communication subsystem 162. The communication network 140 can be a local area network (LAN), a wide area network (WAN; e.g., the internet), or a combination of the two. The communication network 140 can connect the communication subsystem 162 to one or more client devices, such as client device 132*a*-132*n*. The communication subsystem 162 can include software components, hardware components, or a combination of both. For example, the communication subsystem 162 can include a network card (e.g., a wireless network card or a wired network card) that is associated with software to drive the card. The communication subsystem 162 can pass at least a portion of the data, or a pointer to the data in memory, to other subsystems, such as the machine learning subsystem 164, the constraint validation subsystem 166, and the aggregation subsystem 168.

According to some implementations, the response system 160 can obtain such data by generating one or more commands to execute knowledge element retrieval and constrained output generation operations. In some examples, the command(s) can specify a specific timeframe for obtaining the data (e.g., explicitly by identifying the timeframe via a start and an end time or implicitly by requesting data from a current retrieval period). Additionally, the illustrative system 100 can include the proprietary knowledge corpus 170, which can store frameworks, methodologies, constraints, and user-specific rules. Knowledge elements can include any information, document, file, component, or record associated with an entity's proprietary knowledge. For example, knowledge elements can include frameworks, methodologies, constraints, user-specific rules, user-specific preferences, source identifiers, or any other data relevant to generating constrained outputs.

In some implementations, the proprietary knowledge corpus 170 can store preconfigured rules related to retrieving knowledge elements and generating constrained outputs using large language models, which can be used by the response system 160 to manage constraint enforcement processes dynamically. The proprietary knowledge corpus 170 can also include metadata or tags associated with stored data, such as source identifiers, version histories, or knowledge graph relationships. The response system 160 can retrieve data from the proprietary knowledge corpus 170 to refine its constrained output generation processes, validate preliminary outputs against user-specific constraints and preferences, and improve the accuracy of composite responses. Additionally, the proprietary knowledge corpus 170 can store knowledge elements used to update the large language model inputs based on newly collected data, ensuring adaptive and evolving constrained output generation.

The illustrative system 100 can further include an operator device 150, which can receive alerts generated by the response system 160 when a constrained output requires review or when audit trails indicate that human review is warranted. The operator device 150 can be a desktop computer, a mobile device, or other suitable interfaces through which an operator can review constrained output results and monitor outcomes, such as rule violations or response components that do not comply with user-specific constraints. The response system 160 can transmit structured composite responses and citations to the operator device 150 to provide insight into constrained outputs and their corresponding source identifiers.

The disclosed technology provides a system and method for generating constrained outputs for large language models. In particular, systems and methods described herein involve receiving input queries relating to requests, for example, via an interface between a user and a conversational agent. The systems and methods further involve retrieving knowledge elements from proprietary knowledge corpora, generating preliminary outputs using large language models, and applying user-specific rules to generate constrained outputs. Specifically, the present disclosure will be directed to using vector-based retrieval mechanisms to identify relevant knowledge elements, large language models trained to generate preliminary outputs based on knowledge elements, constraint validation engines to ensure outputs comply with user-specific constraints and preferences as logical predicates, and aggregation pipelines that combine constrained outputs and citations to generate composite responses. The system can implement these components in an integrated architecture to provide a comprehensive framework for delivering constrained outputs with traceability through citation generation linking outputs to source identifiers associated with knowledge elements.

Conversational agents refer to a type of interface that enables users to interact with computational resources through natural language exchanges. For example, some conventional conversational agents operate through rule-based systems that match user inputs against predefined patterns and return scripted responses associated with those patterns. Other conventional conversational agents use statistical models that identify associations between inputs and responses from training data (rather than relying on manually authored rules). Further, some conventional conversational agents use neural network architectures that process input text through multiple layers of transformations to generate responses token by token, rather than selecting from predefined templates. These neural network-based agents can generate responses that were not present in training data by identifying patterns of language structure and semantic relationships during training on text corpora.

Avatars refer to a type of interface that evolved from conversational agents by incorporating a representational identity that persists across interactions and presents information through one or more output modalities. An avatar can manifest as a text-based persona, a voice-based persona, and/or a visual persona. In some implementations, the avatar combines multiple modalities by presenting as a two-dimensional or three-dimensional animated figure that exhibits body gestures that correspond to the content being communicated. In some implementations, the avatar presents as a static visual representation or no visual representation. The avatar operates as a point of interaction through which users submit inputs and receive outputs. The constrained output generation system described herein can receive input queries through various input modalities, including interactions with an avatar interface. For example, a user can submit a request by engaging with an avatar through text-based input, voice-based input, or gesture-based input, and the system can adapt its output to a corresponding output modality for presentation via the avatar. The avatar can serve as the point of interaction through which users submit queries relating to requests and receive composite responses along with citations that link the responses to their underlying source materials.

FIG. 2 illustrates system components for a constrained output generation system 200, in accordance with one or more implementations of this disclosure. The constrained output generation system 200 includes a plurality of interconnected components that collectively enable the retrieval of organization-specific knowledge, the generation of AI-based outputs grounded in that knowledge, the enforcement of rule-based constraints, and the production of traceable responses with citations. The constrained output generation system 200 can be implemented as software modules executing on one or more processors, hardware components, or a combination thereof. In some implementations, the components of the constrained output generation system 200 can be distributed across multiple computing devices or consolidated within a single computing system.

The constrained output generation system 200 includes a proprietary knowledge corpus 202, which serves as a repository for storing organization-specific information that informs the generation of responses. The proprietary knowledge corpus 202 can include frameworks, methodologies, constraints, guidelines, research materials, operational procedures, regulatory requirements, or other structured or unstructured data that reflects an entity's particular approaches and requirements. For example, the proprietary knowledge corpus 202 can store investment frameworks, compliance guidelines, risk assessment methodologies, or domain-specific best practices. The proprietary knowledge corpus 202 can be implemented as a relational database, a document store, a vector database, a knowledge graph, or any combination thereof. In some implementations, the proprietary knowledge corpus 202 can include metadata associated with each knowledge element, such as source identifiers, version histories, timestamps, authorship information, or categorization tags. The proprietary knowledge corpus 202 can support continuous updates to incorporate new research, updated guidelines, or regulatory changes while maintaining version histories for compliance and audit purposes. The constrained output generation system 200 implements a specific technical pipeline including: a retrieval index for semantic matching of queries to knowledge elements; a policy validator with repair capability that enforces deterministic constraint compliance; and citations that bind output segments to specific sources, collectively providing a technical architecture that improves the determinism, verifiability, and auditability of AI-generated outputs.

The constrained output generation system 200 includes a retrieval module 204, which is configured to identify and retrieve knowledge elements from the proprietary knowledge corpus 202 that are responsive to an input query. The retrieval module 204 can employ various retrieval techniques to match input queries with relevant knowledge elements. For example, the retrieval module 204 can generate vector representations (e.g., embeddings) of input queries and compare these representations to stored vector representations of knowledge elements using similarity metrics such as cosine similarity, Euclidean distance, or dot product calculations. The retrieval module 204 can select knowledge elements based on a similarity threshold, a ranking of similarity scores, or a predetermined number of top-matching elements. In some implementations, the retrieval module 204 can traverse a knowledge graph to identify connected nodes representing related frameworks, methodologies, or constraints, thereby leveraging relational information to determine contextual relevance. The retrieval module 204 can also employ keyword-based search, semantic search, hybrid search combining multiple techniques, or other retrieval mechanisms. The retrieval module 204 can filter, rank, or prioritize retrieved knowledge elements based on relevance scores, recency, user preferences, or other criteria.

The constrained output generation system 200 includes an AI model 206, which is configured to generate preliminary outputs based on input queries and retrieved knowledge elements. The AI model 206 can be a large language model (LLM), a generative model, a transformer-based model, or another artificial intelligence model capable of processing natural language inputs and generating contextually relevant outputs. For example, the AI model 206 can receive an input query along with one or more knowledge elements and generate a preliminary output that incorporates information from the knowledge elements. The AI model 206 can be a pre-trained model, a fine-tuned model adapted to a specific domain, or a model that has been trained on organization-specific data. In some implementations, the AI model 206 can be hosted locally, accessed via an application programming interface (API), or deployed in a cloud computing environment. The AI model 206 can generate preliminary outputs that include response components, explanations, summaries, or other textual content informed by the retrieved knowledge elements rather than relying solely on general training data.

The constrained output generation system 200 includes a constraint validation engine 208, which is configured to apply rules to preliminary outputs to generate constrained outputs that comply with specified constraints and preferences. The constraint validation engine 208 can parse preliminary outputs to identify discrete response components, such as individual suggestions, action items, or content segments. The constraint validation engine 208 can evaluate each response component against user-specific constraints and user-specific preferences expressed as logical predicates. For example, the constraint validation engine 208 can determine whether a response component satisfies conditions such as risk tolerance thresholds, regulatory requirements, prohibited categories, required disclosures, or other rule-based criteria. The constraint validation engine 208 can modify, remove, flag, or replace response components that violate one or more rules while preserving compliant response components. In some implementations, the constraint validation engine 208 can access a rules database that stores user-specific rules, entity-specific rules, or regulatory rules. The constraint validation engine 208 can support various rule formats, including Boolean expressions, conditional statements, threshold comparisons, pattern matching rules, or other logical constructs. The constraint validation engine 208 improves computer functionality by transforming the nondeterministic outputs of the AI model 206 into deterministic, policy-compliant outputs through systematic evaluation and repair at the recommendation component level, thereby reducing the incidence of non-compliant machine-generated text that would otherwise require manual review or correction.

The constrained output generation system 200 includes a citation generator 210, which is configured to generate citations that link constrained outputs to source identifiers associated with the knowledge elements from which the outputs were derived. The citation generator 210 can associate each constrained output or portion thereof with metadata identifying the specific knowledge element, document, section, or data source that informed the output. For example, the citation generator 210 can generate citations that include document identifiers, version numbers, timestamps, page references, section identifiers, or uniform resource locators (URLs). The citation generator 210 enables traceability between generated outputs and their underlying sources, thereby supporting explainability, auditability, and accountability of the response generation process. In some implementations, the citation generator 210 can generate inline citations, footnotes, endnotes, hyperlinks, or structured citation objects that can be rendered in various formats. The citations generated by the citation generator 210 are machine-verifiable, enabling compliance systems to programmatically verify the source, version, and offset of each output segment without requiring human inspection, thereby improving the efficiency and reliability of audit processes in enterprise systems.

The constrained output generation system 200 includes an aggregation module 212, which is configured to combine constrained outputs and citations from multiple knowledge elements to generate a composite response. The aggregation module 212 can receive constrained outputs and corresponding citations generated for each of a plurality of knowledge elements and organize them into a unified response structure. For example, the aggregation module 212 can merge, concatenate, deduplicate, or synthesize constrained outputs to produce a coherent composite response. The aggregation module 212 can organize the composite response according to relevance, priority, topic, chronology, or other organizational criteria. In some implementations, the aggregation module 212 can resolve conflicts or redundancies between constrained outputs derived from different knowledge elements. The aggregation module 212 can also format the composite response and associated citations for presentation via a user interface, adapting the output to various output modalities such as text displays, audio outputs, or structured data formats. The aggregation module 212 can transmit the composite response and plurality of citations to a user interface for presentation to a user.

In some implementations, the system receives, via a user interface associated with an entity, an input query relating to a request from a user. In some implementations, the system receives, via an input modality, an input query relating to a request. An input query can refer to any request, question, or prompt submitted by a user seeking a response from the system. The input query can be submitted through various mechanisms, including web interfaces, application interfaces, voice interfaces, or other input mechanisms associated with the entity. For example, a user can submit a text-based query through a web portal, speak a query through a voice-enabled device, or interact with a conversational agent through a messaging interface. The user interface can be any interface that enables communication between the user and the system, such as a graphical user interface (GUI), a command-line interface, an application programming interface (API), or a natural language interface. The entity can be an organization, company, institution, or other body that maintains the proprietary knowledge corpus and provides the response service. Thus, the input query serves as the initial trigger for the constrained output generation process.

The system retrieves, from a proprietary knowledge corpus stored in a database, a plurality of knowledge elements responsive to the input query. In some implementations, the system retrieves, from a proprietary knowledge corpus, a plurality of knowledge elements responsive to the input query. A proprietary knowledge corpus can refer to a collection of organization-specific information, documents, data, and other materials that are owned, controlled, or curated by the entity. The proprietary knowledge corpus can contain firm-specific frameworks, research materials, and methodologies that reflect the entity's particular approaches, expertise, and institutional knowledge. For example, in a financial services context, the proprietary knowledge corpus can include investment frameworks, portfolio construction methodologies, market research, economic analyses, sector-specific insights, risk assessment models, compliance guidelines, and proprietary analytical tools developed by the entity. The proprietary knowledge corpus can also include operational procedures, best practices, training materials, policy documents, regulatory interpretations, client communication templates, or other materials that embody the entity's accumulated knowledge and standardized approaches. The knowledge elements within the proprietary knowledge corpus can be structured data, unstructured documents, semi-structured records, or combinations thereof. The proprietary knowledge corpus distinguishes the system's outputs from generic responses by grounding responses in the entity's specific intellectual property and institutional perspective rather than relying solely on general information derived from broad training data.

The proprietary knowledge corpus can address a fundamental limitation of conventional AI systems that generate responses based solely on general training data without incorporating institutional expertise or preferences. Existing AI systems produce generic responses that fail to reflect a firm's specific investment philosophy, approved products, or proprietary research. The disclosed system overcomes this limitation by grounding every response in the proprietary knowledge base through retrieval-augmented generation. When generating responses, the system retrieves relevant knowledge elements that embody the firm's investment philosophy, approved product lists, and internal research, and uses these elements to inform the AI model's outputs. This approach ensures that responses reflect firm-specific portfolio construction rules, risk parameters, and strategic perspectives rather than generic advice derived from broad training data. The system further enhances accountability by generating citations that link each portion of a response to specific internal sources, enabling users to understand the reasoning behind responses and verify that outputs align with the firm's established frameworks and methodologies.

In some implementations, the proprietary knowledge corpus includes a knowledge graph representing relationships between the one or more of the frameworks, the methodologies, or the constraints. In particular, retrieving the plurality of knowledge elements includes traversing the knowledge graph to identify connected nodes representing related frameworks, methodologies, or constraints. Moreover, the system uses the relationships represented in the knowledge graph to determine contextual relevance of each knowledge element to the input query. A knowledge graph can refer to a structured representation of knowledge that models entities as nodes and relationships between entities as edges. For example, a knowledge graph can represent that a particular framework is related to a specific methodology, or that a constraint applies to a certain category of responses. Traversing the knowledge graph can involve starting from nodes that match the input query and following edges to identify connected nodes that represent related knowledge elements. The relationships in the knowledge graph can provide contextual information that helps the system determine which knowledge elements are most relevant to the input query. For example, if the input query relates to a particular topic, the system can traverse the knowledge graph to identify frameworks, methodologies, and constraints that are connected to that topic through various relationship types. This knowledge graph-based retrieval approach enables the system to leverage structured relationships between knowledge elements to improve retrieval accuracy and comprehensiveness.

The plurality of knowledge elements stored in the proprietary knowledge corpus includes one or more of frameworks, methodologies, or constraints. In particular, the plurality of knowledge elements is specific to the entity. A proprietary knowledge corpus can refer to a collection of information, documents, data, and other materials that are owned or controlled by the entity and reflect the entity's particular approaches, guidelines, and requirements. Knowledge elements can include any discrete unit of information within the corpus, such as frameworks (structured approaches or models for addressing particular types of problems), methodologies (systematic procedures or processes for accomplishing tasks), or constraints (rules, limitations, or requirements that govern acceptable outputs). For example, a knowledge element can be a document describing a particular analytical framework, a set of guidelines for evaluating certain types of situations, or a collection of rules that define acceptable parameters for responses. The database can be any storage system capable of storing and retrieving the knowledge elements, such as a relational database, a document database, a vector database, or a knowledge graph database. The retrieval process identifies knowledge elements that are relevant to the input query, enabling the system to ground its outputs in entity-specific information rather than relying solely on general training data.

In some implementations, the proprietary knowledge corpus can include proprietary research reports, market analyses, economic outlooks, and sector-specific investment theses developed by the entity's research teams. For example, the corpus can include quarterly economic forecasts, industry white papers, company-specific research notes, and thematic investment reports that reflect the entity's views on market conditions, sector trends, and individual securities. The corpus can also include historical performance analyses, back-tested strategy results, and case studies documenting past investment decisions and their outcomes. These materials embody the entity's accumulated expertise and institutional memory, enabling the system to generate responses that reflect the entity's research-driven insights rather than generic market commentary.

In some implementations, the proprietary knowledge corpus can include firm-specific preferences and ideologies that define the entity's investment philosophy and approach to wealth management. For example, the corpus can include documents articulating the entity's stance on active versus passive investment management, its preferred asset classes and investment vehicles, and its views on environmental, social, and governance (ESG) considerations. The corpus can include policy statements defining the entity's approach to alternative investments, concentrated stock positions, tax-loss harvesting strategies, and charitable giving vehicles. The corpus can also include guidelines specifying the entity's preferred custodians, approved product lists, and fee structures. These firm-specific preferences ensure that responses align with the entity's brand identity, regulatory posture, and strategic priorities rather than reflecting generic industry practices.

In some implementations, the proprietary knowledge corpus can include portfolio construction logic that defines the entity's systematic approach to building and managing investment portfolios. For example, the corpus can include asset allocation models specifying target weights for equities, fixed income, alternatives, and cash across different risk profiles and investment horizons. The corpus can include rebalancing rules defining thresholds and frequencies for portfolio adjustments, drift tolerance parameters, and tax-aware rebalancing procedures. The corpus can also include diversification requirements specifying maximum concentration limits for individual securities, sectors, geographic regions, and asset classes. Additionally, the corpus can include risk management frameworks defining acceptable levels of portfolio volatility, drawdown limits, and correlation constraints between portfolio holdings. These portfolio construction elements enable the system to generate responses that conform to the entity's disciplined investment process and risk management standards.

In some implementations, the proprietary knowledge corpus can include client segmentation frameworks and suitability criteria that define how the entity tailors responses to different client profiles. For example, the corpus can include risk tolerance questionnaires and scoring methodologies, investment policy statement templates, and client classification schemas based on net worth, investment experience, time horizon, and liquidity needs. The corpus can include guidelines for matching specific investment strategies and products to particular client segments, ensuring that responses are appropriate for each client's circumstances. The corpus can also include regulatory compliance checklists, disclosure requirements, and documentation standards that govern the response process. These suitability elements enable the system to generate responses that are not only aligned with the entity's investment philosophy but also appropriate for the specific client receiving the response.

In some implementations, retrieving the plurality of knowledge elements includes generating a vector representation of the input query. The system compares the vector representation to a plurality of stored vector representations corresponding to the plurality of knowledge elements. The system selects the plurality of knowledge elements based on a similarity threshold. A vector representation can refer to a numerical representation of text in a high-dimensional vector space, where semantically similar texts are represented by vectors that are close together in the space. Vector representations can be generated using embedding models, such as word embedding models, sentence embedding models, or document embedding models, that transform text into fixed-length numerical vectors. For example, the system can use a transformer-based embedding model to generate a vector representation of the input query. The stored vector representations can be pre-computed embeddings of the knowledge elements stored in a vector database or index. The comparison process can involve computing a similarity metric, such as cosine similarity or Euclidean distance, between the query vector and each stored vector. The similarity threshold can be a predefined value that determines the minimum similarity required for a knowledge element to be considered relevant to the input query. This vector-based retrieval approach enables semantic matching between queries and knowledge elements, allowing the system to identify relevant knowledge elements even when the query and the knowledge element do not share exact keywords.

In some implementations, the system inputs, into an AI model, the input query and the knowledge element to generate a preliminary output. For each knowledge element of the plurality of knowledge elements, the system can input, into a large language model (LLM), the input query and the knowledge element to generate a preliminary output. In particular, the preliminary output is based on the knowledge element. A large language model can refer to an artificial intelligence system trained on extensive text corpora to generate human-like text responses, utilizing deep learning architectures such as transformer networks to process input sequences and produce contextually relevant outputs.

The preliminary output can be any response, recommendation, or text generated by the AI model based on the combination of the input query and the knowledge element. By providing both the input query and the knowledge element as inputs to the model, the system ensures that the generated output is informed by the specific knowledge element rather than relying solely on the model's general training data. For example, the system can construct a prompt that includes the user's query along with relevant content from the knowledge element, and the model can generate a response that incorporates information from both sources. This approach enables the system to produce outputs that are grounded in the entity's proprietary knowledge while leveraging the language generation capabilities of the model.

For each knowledge element of the plurality of knowledge elements, the system applies one or more user-specific rules to the preliminary output to generate a constrained output. In some implementations, the system applies one or more rules to the preliminary output to generate a constrained output. The one or more user-specific rules enforce compliance with user-specific constraints and user-specific preferences. In some implementations, the one or more rules enforce compliance with one or more constraints. User-specific rules can refer to any rules, conditions, or requirements that are associated with a particular user or user profile and that govern what types of outputs are acceptable for that user. User-specific constraints can include limitations, restrictions, or requirements that define boundaries for acceptable responses, such as maximum or minimum values, prohibited categories, or required elements. User-specific preferences can include indications of what the user prefers or prioritizes, such as preferred formats, favored approaches, or weighted criteria. By applying these rules to the preliminary output, the system ensures that the final constrained output conforms to the user's specific requirements and preferences.

In some implementations, the one or more user-specific rules are stored in a rules database associated with the user. In some implementations, the one or more rules are stored in a rules database associated with a user. A rules database can refer to any storage system that maintains rules, constraints, and preferences associated with users or user profiles. The rules database can be organized by user identifier, user group, or other categorization scheme that enables the system to retrieve the appropriate rules for a given user. For example, the rules database can store rules as structured data records that include rule identifiers, rule definitions, applicability conditions, and associated user identifiers. The system can query the rules database to retrieve the rules applicable to a particular user when processing that user's input query. This approach enables the system to maintain and apply different rules for different users, supporting personalized constraint enforcement based on individual user requirements and preferences.

The combination of AI model inference with rule-based constraint enforcement represents a hybrid reasoning approach that provides technical advantages over systems that rely exclusively on either approach. For example, this approach improves computer functionality by combining the contextual generation capabilities of AI models with the deterministic compliance guarantees of rule-based systems, thereby producing outputs that are both contextually relevant and verifiably compliant with specified constraints. AI models excel at generating contextually relevant and nuanced outputs based on complex inputs, but they lack deterministic guarantees about compliance with specific rules or constraints. Conversely, purely rule-based systems can enforce compliance deterministically but lack the flexibility to generate nuanced, context-aware outputs. The disclosed system combines these approaches by using the AI model to generate preliminary outputs that leverage the model's language understanding and generation capabilities, and then applying rule-based logic to enforce compliance with user-specific constraints and preferences. This hybrid approach enables the system to produce outputs that are both contextually relevant and compliant with applicable rules. For example, in a portfolio construction context, the AI model can generate responses that consider market conditions, client objectives, and relevant knowledge elements, while the rule-based constraint enforcement ensures that the responses comply with portfolio allocation limits, prohibited investment categories, and regulatory requirements. This separation of concerns allows each component to operate within its area of strength while the overall system benefits from the capabilities of both approaches.

In some implementations, applying the one or more user-specific rules to the preliminary output to generate the constrained output includes parsing the preliminary output to identify one or more response components. A response component can refer to any discrete element, section, or portion of the preliminary output that can be individually evaluated against the rules. For example, if the preliminary output contains multiple suggestions or pieces of advice, each suggestion can be treated as a separate response component. The parsing process can involve natural language processing techniques to segment the preliminary output into its constituent parts, identify the boundaries between different components, and extract relevant attributes or features from each component. For example, the system can use named entity recognition, dependency parsing, or semantic role labeling to identify and categorize different elements within the preliminary output. This parsing step enables the system to evaluate each component individually against the applicable rules.

Applying the one or more user-specific rules further includes evaluating each response component against the user-specific constraints and the user-specific preferences as logical predicates. In some implementations, the system evaluates each response component against the one or more constraints as logical predicates. A logical predicate can refer to a statement or expression that evaluates to true or false based on the attributes or characteristics of the response component. For example, a constraint can be expressed as a predicate such as "the response does not include category X" or "the value is within range Y." The system can evaluate each response component against each applicable predicate to determine whether the component satisfies the constraint or preference. This evaluation process can involve comparing extracted attributes from the response component against threshold values, checking for the presence or absence of certain elements, or applying more complex logical expressions that combine multiple conditions. By treating constraints and preferences as logical predicates, the system can systematically and consistently evaluate compliance across all response components.

Applying the one or more user-specific rules further includes modifying at least one response component that violates at least one user-specific rule while preserving compliant response components. In some implementations, the system modifies at least one response component that violates at least one rule while preserving compliant response components. This modification process can involve various techniques depending on the nature of the violation and the type of response component. For example, the system can remove the violating component entirely, replace it with an alternative component that satisfies the rules, adjust specific values or attributes within the component to bring it into compliance, or flag the component for human review. The system preserves response components that already comply with the applicable rules, ensuring that valid portions of the preliminary output are retained in the constrained output. This selective modification approach enables the system to enforce compliance while minimizing unnecessary changes to the output. For example, if a preliminary output contains five response components and only one violates a user-specific rule, the system can modify or remove that one component while keeping the other four intact.

For each knowledge element of the plurality of knowledge elements, the system generates a citation linking the constrained output to a source identifier associated with the knowledge element. A citation can refer to any reference, link, or attribution that connects a portion of the output to its underlying source material. A source identifier can be any unique identifier associated with a knowledge element, such as a document identifier, a version number, a uniform resource identifier (URI), or a combination of metadata fields that uniquely identify the source. For example, a citation can include a document title, publication date, section reference, and version number that together identify the specific knowledge element from which the constrained output was derived. This citation mechanism enables traceability between generated outputs and their underlying sources, supporting explainability and auditability of the responses. Users can review the citations to understand the basis for particular responses and verify that the outputs are grounded in appropriate source materials.

The citation generation mechanism can address a technical challenge of explainability. Conventional AI systems generate outputs based on patterns learned during training, but these systems cannot identify or reference the specific sources that informed particular portions of their outputs. The disclosed system overcomes this limitation by maintaining associations between generated content and the knowledge elements from which that content was derived. When the system generates a constrained output based on a knowledge element, the citation generator creates a structured reference that identifies the specific source material. This source-level traceability provides several technical benefits. First, users can verify that responses are grounded in authoritative and current source materials rather than potentially outdated or generic information from training data. Second, auditors or compliance personnel can trace any portion of a response back to its underlying source to assess whether the response appropriately reflects the cited material. Third, when knowledge elements are updated, the system can identify which previously generated responses were based on superseded versions of those elements. The citation mechanism thus transforms the response generation process from an opaque operation into a transparent and auditable workflow where each output component can be linked to its informing source.

The system aggregates the constrained output and the citation for each knowledge element of the plurality of knowledge elements to generate a composite response. A composite response can refer to a combined output that incorporates constrained outputs derived from multiple knowledge elements, along with their corresponding citations. The aggregation process can involve combining, organizing, and structuring the individual constrained outputs into a coherent whole. For example, the system can concatenate the constrained outputs, organize them by topic or relevance, remove redundant information, or synthesize them into a unified response. The aggregation process can also involve formatting the citations in a consistent manner and associating each citation with the corresponding portion of the composite response. This aggregation step enables the system to provide comprehensive responses that draw on multiple knowledge elements while maintaining traceability to the underlying sources.

In some implementations, the system can resolve conflicts or redundancies between constrained outputs derived from different knowledge elements. Conflicts can arise when multiple knowledge elements provide responses that are inconsistent with each other, such as when one knowledge element suggests a particular approach while another knowledge element suggests an incompatible approach. Redundancies can occur when multiple knowledge elements provide overlapping or duplicative responses that, if included without modification, can result in repetitive content in the composite response. The system can employ various techniques to identify and resolve such conflicts and redundancies during the aggregation process.

Conflict resolution can involve detecting inconsistencies between constrained outputs and applying resolution strategies to produce a coherent composite response. For example, the system can compare constrained outputs to identify contradictory responses, such as responses that specify mutually exclusive options or responses that provide conflicting guidance on the same topic. When conflicts are detected, the system can apply resolution strategies such as prioritizing outputs based on the recency, authority, or specificity of the underlying knowledge elements. For instance, if a more recent knowledge element provides guidance that conflicts with an older knowledge element, the system can prioritize the more recent guidance. In some implementations, if a more specific knowledge element provides guidance that conflicts with a more general knowledge element, the system can prioritize the more specific guidance. The system can also flag unresolved conflicts for human review when automated resolution is not appropriate or when the conflict involves considerations that require human judgment.

Redundancy resolution can involve identifying overlapping content between constrained outputs and consolidating or deduplicating that content to produce a more concise composite response. For example, the system can compare constrained outputs to identify responses that convey substantially similar information, even if expressed in different terms. When redundancies are detected, the system can merge the redundant responses into a single consolidated response, select one representative response while discarding duplicates, or synthesize the redundant responses into a unified statement that captures the common content. The system can preserve citations from all contributing knowledge elements when consolidating redundant content, ensuring that the composite response maintains traceability to all relevant sources even when the textual content has been deduplicated.

The conflict and redundancy resolution processes can leverage semantic analysis techniques to identify relationships between constrained outputs. For example, the system can generate vector representations of constrained outputs and compute similarity scores to identify outputs that address the same topic or provide related guidance. The system can also employ natural language understanding techniques to extract the semantic content of responses and compare that content to detect conflicts or overlaps that might not be apparent from surface-level textual comparison. By applying these techniques during aggregation, the system can produce composite responses that are coherent, non-redundant, and appropriately prioritized based on the characteristics of the underlying knowledge elements.

FIG. 3 illustrates a process 300 for generating a composite response, in accordance with one or more implementations of this disclosure. The process 300 depicts the flow of data through the constrained output generation system from initial input to final response output. The process 300 begins with an input query 302, which represents the request submitted by a user through a user interface. The input query 302 can be a natural language question, a structured request, or any other form of input seeking a response from the system. For example, the input query 302 can be a text-based question submitted through a web portal, a voice command captured through a voice-enabled device, or a structured data request submitted through an application programming interface.

The process 300 also includes knowledge elements 304, which represent the plurality of knowledge elements retrieved from the proprietary knowledge corpus in response to the input query 302. The knowledge elements 304 can include frameworks, methodologies, constraints, guidelines, or other organization-specific information that informs the generation of responses. For example, the knowledge elements 304 can include a risk assessment framework, a compliance methodology, or a set of operational constraints specific to the entity. Both the input query 302 and the knowledge elements 304 feed into an AI model 306, which processes these inputs to generate outputs.

The AI model 306 can be a large language model, a transformer-based model, a generative model, or any other artificial intelligence model capable of processing natural language inputs and generating contextually relevant outputs. For example, the AI model 306 can be a pre-trained language model that has been fine-tuned for the entity's domain, or a general-purpose language model that receives the knowledge elements 304 as context for generating responses. The AI model 306 produces a preliminary output 308, which represents the initial response generated by the AI model 306 based on the combination of the input query 302 and the knowledge elements 304. The preliminary output 308 can include one or more response components, explanations, summaries, or other textual content that addresses the input query 302. For example, the preliminary output 308 can include a set of suggested actions, a list of considerations, or a narrative response that incorporates information from the knowledge elements 304.

The preliminary output 308 flows to a constrained output 310, which represents the result of applying one or more rules to the preliminary output 308. The constrained output 310 is generated by parsing the preliminary output 308 to identify response components, evaluating each response component against applicable constraints and preferences as logical predicates, and modifying components that violate rules while preserving compliant components. For example, if the preliminary output 308 includes a response that exceeds a user-specified threshold, the system can modify or remove that response to produce the constrained output 310.

The process 300 also includes a citation 312, which is generated for the constrained output 310 and links the constrained output 310 to a source identifier associated with the knowledge element from which the output was derived. The citation 312 can include document identifiers, version numbers, section references, timestamps, or other metadata that enables traceability between the constrained output 310 and its underlying source material. For example, the citation 312 can reference a specific framework document, a particular version of a methodology, or a section of a compliance guideline. Both the constrained output 310 and the citation 312 flow into a composite response 314, which represents the aggregated output that combines constrained outputs and citations from multiple knowledge elements. The composite response 314 can be organized by relevance, topic, priority, or other criteria, and can be formatted for presentation via the user interface. For example, the composite response 314 can be a structured document that includes multiple response sections, each with corresponding citations that link to the underlying knowledge elements. The composite response 314 is then transmitted to the user interface for presentation to the user.

In some implementations, the system transmits, to the user interface, the composite response and a plurality of citations corresponding to the plurality of knowledge elements. In some implementations, the system adapts the composite response to an output modality corresponding to the input modality. In particular, adapting the composite response includes formatting the composite response for presentation via the output modality. The system then transmits, via the output modality, the composite response and a plurality of citations corresponding to the plurality of knowledge elements. The transmission process can involve sending the composite response and citations to the user interface through the communication network, formatting the output for display or presentation, and rendering the output in a manner appropriate for the user interface type. For example, if the user interface is a web interface, the system can transmit the composite response as HTML content with embedded citation links. If the user interface is a voice interface, the system can transmit the composite response as synthesized speech with verbal citation references. The output modality can correspond to the input modality, such that a user who submits a voice query receives a voice response, or a user who submits a text query receives a text response. This transmission step completes the constrained output generation process by delivering the final response to the user.

In some implementations, the composite response can be transmitted or presented through an avatar interface. An avatar can manifest as a text-based persona, a voice-based persona, a visual persona, or a combination of multiple modalities. When the system transmits the composite response via an avatar, the avatar can present the response through synthesized speech that conveys the response content along with verbal references to the underlying citations. For example, the avatar can speak the response while displaying visual indicators that correspond to citation references, enabling the user to understand both the response and its sources. In implementations where the avatar presents as a two-dimensional or three-dimensional animated figure, the avatar can exhibit body gestures, facial expressions, or other visual cues that correspond to the content being communicated, such as emphasizing particular response components or indicating transitions between different portions of the composite response derived from different knowledge elements.

The system can adapt the presentation of the composite response based on the capabilities of the avatar or the preferences of the user. For example, if the avatar supports visual display, the system can render the citations as interactive elements that the user can select to view additional details about the underlying knowledge elements. If the avatar operates primarily through voice, the system can structure the response as a conversational response that naturally incorporates citation references, such as by stating "according to the risk assessment framework" or "based on the compliance methodology." The avatar can also provide follow-up interactions that allow the user to request additional information about specific citations or to explore related knowledge elements.

In addition to avatar-based presentation, the system can transmit the composite response through other output modalities. For example, the system can render the composite response as a structured document for display on a graphical user interface, as an audio stream for playback through speakers or headphones, as a data object for consumption by downstream applications through an application programming interface, or as a combination of modalities that present information through multiple channels simultaneously. The selection of output modality can be based on the input modality used by the user, the capabilities of the user interface, user preferences stored in a user profile, or other factors. This flexibility in output modalities enables the system to deliver composite responses in formats that are appropriate for diverse use cases and user contexts.

In some implementations, the system maintains an audit trail linking the constrained output to a version of the knowledge element from which the constrained output was derived. An audit trail can refer to a record that documents the sequence of activities, decisions, and data sources involved in generating a particular output. The audit trail can include information such as the input query, the retrieved knowledge elements, the versions of those knowledge elements, the preliminary outputs generated by the AI model, the rules applied, the modifications made, and the final constrained output. By linking the constrained output to a specific version of the knowledge element, the system enables retrospective analysis of how responses were generated and what sources informed them. This audit trail capability supports compliance with requirements for explainability and accountability in automated advisory systems. For example, if a user or auditor needs to understand why a particular response was made, they can review the audit trail to trace the response back to its underlying sources and the rules that were applied. The audit trail mechanism improves computer functionality by enabling reproducibility across changing corpora, such that the same input query processed against the same version of knowledge elements yields the same cited sources and versions, providing a technical guarantee that is not achievable with conventional AI systems that lack version-aware provenance tracking.

The citation generation and audit trail mechanisms described above collectively provide a provenance tracking capability that supports regulatory compliance in domains where accountability for automated responses is required. By generating citations that link each portion of a constrained output to a specific source identifier, and by maintaining audit trails that document the versions of knowledge elements used to generate those outputs, the system creates a comprehensive record of the informational basis for each response. This provenance tracking enables organizations to demonstrate that responses were derived from authoritative and approved source materials, to identify which version of a framework or methodology was in effect when a particular response was generated, and to reconstruct the reasoning process that led to a specific output. In regulated industries where advisory systems must satisfy requirements for transparency and auditability, this provenance tracking capability provides the documentary evidence necessary to support compliance reviews, respond to regulatory inquiries, and maintain accountability for automated decision-making processes.

In some implementations, the system updates the proprietary knowledge corpus. In particular, updating the proprietary knowledge corpus includes maintaining a history of changes to the plurality of knowledge elements for regulatory compliance. The system can support continuous updates to the knowledge corpus as new information becomes available, guidelines are revised, or requirements change. Maintaining a history of changes can involve storing previous versions of knowledge elements, recording timestamps and descriptions of changes, and tracking the provenance of updates. This version history enables the system to support regulatory compliance requirements that mandate retention of historical records and the ability to reconstruct the state of the knowledge corpus at any point in time. For example, if regulations require that responses be traceable to the version of guidelines that were in effect at the time the response was made, the system can use the version history to identify the appropriate version of each knowledge element. This capability also enables the system to roll back changes if necessary and to analyze how changes to the knowledge corpus have affected responses over time.

In some implementations, the system performs continuous updates to the proprietary knowledge corpus to incorporate new information as it becomes available. The continuous update process enables the system to maintain current and relevant knowledge elements without requiring retraining of the underlying AI model. The system can receive new research documents, updated market views, regulatory guidance, and other materials through various ingestion pathways, including automated feeds, manual uploads, or integration with external data sources. When a new document is received, the system can perform document parsing to extract textual content from various file formats, including portable document format (PDF) files, word processing documents, spreadsheets, or structured data files. The system can apply optical character recognition (OCR) to extract text from scanned documents or images. The system then performs document segmentation to divide the extracted content into discrete knowledge elements, such as sections, paragraphs, or semantic units that can be individually indexed and retrieved. The segmentation process can use structural cues from the document, such as headings, section breaks, or formatting markers, as well as semantic analysis to identify coherent units of information.

For each newly ingested knowledge element, the system generates a vector representation using an embedding model. The embedding model transforms the textual content of the knowledge element into a fixed-length numerical vector in a high-dimensional vector space. The system can use transformer-based embedding models, sentence embedding models, or domain-specific embedding models that have been trained or fine-tuned to capture semantic relationships relevant to the entity's knowledge domain. The generated vector representation is stored in a vector database or index alongside the original knowledge element content and associated metadata, such as source identifiers, timestamps, authorship information, and categorization tags. The vector database can employ approximate nearest neighbor (ANN) algorithms, such as hierarchical navigable small world (HNSW) graphs or inverted file indexes, to enable efficient similarity search across large collections of vector representations.

The system handles integration of market views by processing periodic updates from research teams, portfolio managers, or external market data providers. Market views can include economic forecasts, sector outlooks, asset class expectations, and tactical positioning responses. When new market views are received, the system extracts the relevant content, generates vector representations, and indexes the new knowledge elements in the proprietary knowledge corpus. The system can associate market views with temporal metadata indicating the effective date range or validity period, enabling the retrieval module to prioritize current market views over outdated perspectives when responding to input queries. The system can also maintain relationships between market views and related knowledge elements, such as linking a sector outlook to the underlying research reports and analytical frameworks that support the outlook.

The system handles integration of regulatory guidance by monitoring regulatory sources, processing new guidance documents, and updating the proprietary knowledge corpus accordingly. Regulatory guidance can include rules, interpretations, enforcement actions, frequently asked questions, and other materials issued by regulatory bodies. When new regulatory guidance is received, the system parses the guidance document, extracts relevant provisions and requirements, and generates vector representations for the extracted content. The system can classify regulatory guidance according to applicable jurisdictions, affected products or services, and compliance deadlines. The system can also update the rules database to incorporate new regulatory requirements as constraints that the constraint validation engine applies to preliminary outputs. By integrating regulatory guidance into the proprietary knowledge corpus, the system ensures that generated responses reflect current regulatory requirements and that the constraint validation engine enforces compliance with applicable rules.

As an illustrative example, the system can be applied to generate responses in a financial advisory context. For example, a user can submit an input query through a web interface associated with a financial services entity, where the input query requests guidance on portfolio allocation strategies for a client with specific risk tolerance parameters. The system receives the input query and retrieves knowledge elements from the proprietary knowledge corpus that are responsive to the query. The retrieved knowledge elements can include a risk assessment framework that defines categories of risk tolerance and corresponding allocation ranges, a methodology for evaluating asset classes based on market conditions, portfolio construction rules that specify diversification requirements and rebalancing thresholds, and constraints that specify regulatory requirements for client suitability determinations.

For each retrieved knowledge element, the system inputs the input query and the knowledge element into an AI model to generate a preliminary output. For example, when processing the risk assessment framework, the AI model can generate a preliminary output that includes response components such as suggested allocation percentages for equities, fixed income, and alternative investments based on the client's risk tolerance category. When processing the asset evaluation methodology, the AI model can generate a preliminary output that includes considerations for current market conditions and sector-specific factors. When processing the portfolio construction rules, the AI model can generate a preliminary output that includes minimum and maximum allocation thresholds for each asset class, correlation constraints between holdings, concentration limits for individual securities, and rebalancing triggers based on drift from target allocations. When processing the regulatory constraints, the AI model can generate a preliminary output that includes required disclosures and documentation requirements.

The system applies user-specific rules to each preliminary output to generate constrained outputs. For example, the user profile can include constraints specifying that the client has expressed a preference to exclude certain investment categories, that allocation to any single asset class cannot exceed a specified percentage, that the portfolio must maintain minimum diversification across a specified number of holdings, and that responses must include specific risk disclosures. The system parses each preliminary output to identify response components, evaluates each component against these constraints as logical predicates, and modifies components that violate the rules while preserving compliant components. If a preliminary output includes a response for an excluded investment category, the system removes or replaces that response component. If a preliminary output suggests an allocation percentage that exceeds the specified maximum, the system adjusts the percentage to comply with the constraint. If a preliminary output violates portfolio construction rules such as concentration limits or diversification requirements, the system modifies the response to bring it into compliance with the applicable portfolio construction parameters.

The system generates citations linking each constrained output to the source identifier associated with the knowledge element from which the output was derived. For example, a citation can reference the specific version of the risk assessment framework document, including a document identifier, version number, and effective date. Another citation can reference the asset evaluation methodology with corresponding metadata. A further citation can reference the portfolio construction rules document that specifies the diversification requirements and allocation thresholds applied to the response. These citations enable the user to trace each portion of the response back to its underlying source material.

The system aggregates the constrained outputs and citations from each knowledge element to generate a composite response. The composite response can include a structured presentation of the portfolio allocation guidance, organized by asset class and accompanied by explanations derived from the knowledge elements. Each section of the composite response can include corresponding citations that identify the frameworks, methodologies, portfolio construction rules, and constraints that informed that portion of the response. The system transmits the composite response and the plurality of citations to the user interface for presentation to the user.

The user can review the composite response and select individual citations to view additional details about the underlying knowledge elements. If the user has questions about a particular response component, the user can submit a follow-up query, and the system can retrieve additional knowledge elements or provide further explanation based on the cited sources. The system maintains an audit trail that documents the input query, the retrieved knowledge elements and their versions, the preliminary outputs, the rules applied, the modifications made, and the final composite response. This audit trail supports compliance with regulatory requirements for explainability and enables retrospective analysis of how the response was generated.

Figure 7:
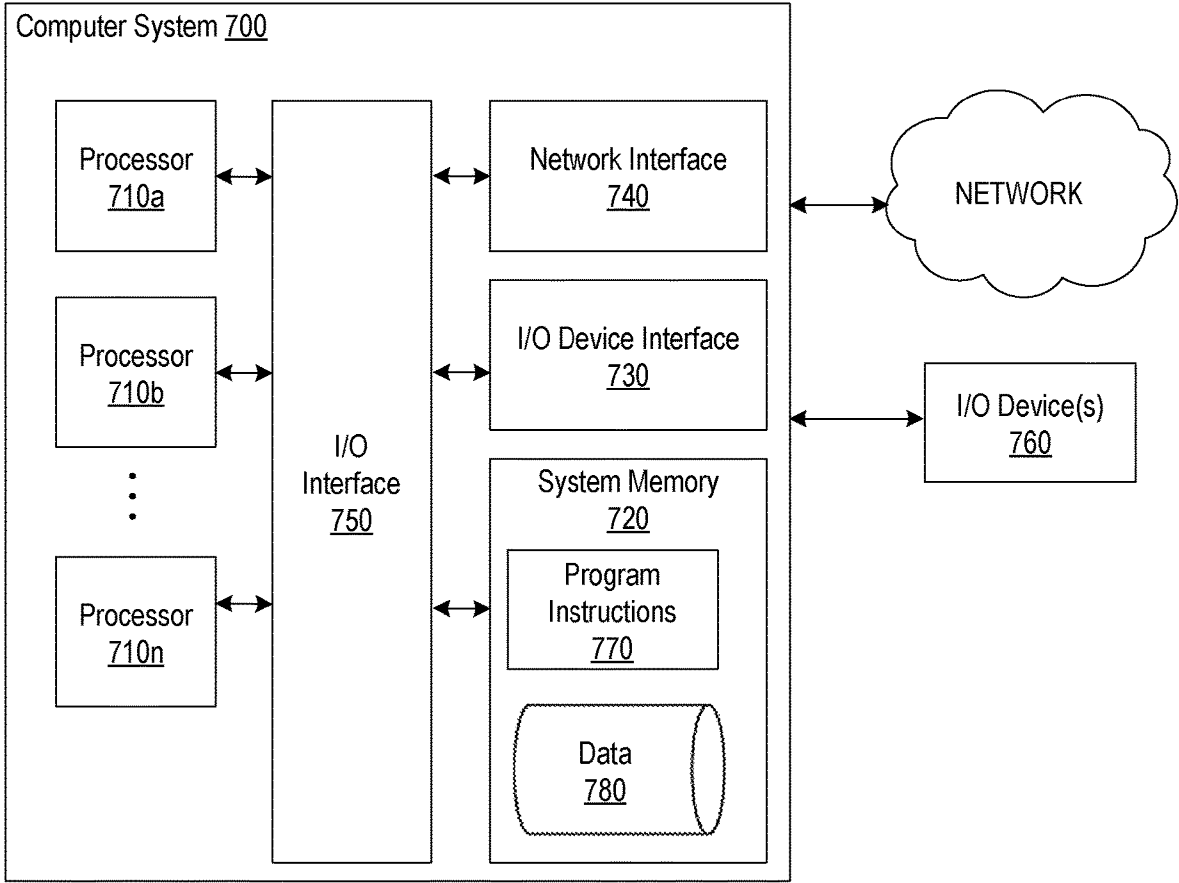
FIG. 7 illustrates an example computing system that may be used in accordance with some implementations of this disclosure.

FIG. 4 illustrates a flowchart of a process 400 for generating a composite response, in accordance with one or more implementations of this disclosure. The operations of FIG. 4 can use components described in relation to FIGS. 1-3. In some implementations, the response system 160 can include one or more components of computer system 700, as shown in FIG. 7.

At step 402, the response system 160 (e.g., using one or more of processors 710*a*-710*n*) can receive, via a user interface associated with an entity, an input query relating to a request from a user. For example, the input query can be submitted through a web interface, application interface, or other input mechanism associated with the entity. The system can receive the input query through a secure communication channel and parse the query to identify relevant parameters for subsequent knowledge element retrieval.

At step 404, the response system 160 (e.g., using one or more of processors 710*a*-710*n*) can retrieve, from a proprietary knowledge corpus stored in a database, a plurality of knowledge elements responsive to the input query. For example, the system can generate a vector representation of the input query, compare the vector representation to stored vector representations corresponding to knowledge elements, and select knowledge elements based on a similarity threshold. The plurality of knowledge elements can include one or more of frameworks, methodologies, or constraints that are specific to the entity.

At step 406, the response system 160 (e.g., using one or more of processors 710*a*-710*n*) can input, into an AI model such as a large language model, the input query and each knowledge element to generate a preliminary output. For example, for each knowledge element of the plurality of knowledge elements, the system can provide the input query and the knowledge element as inputs to the AI model, which generates a preliminary output based on the knowledge element. The preliminary output can include response components that are informed by the specific knowledge element rather than relying solely on general training data.

At step 408, the response system 160 (e.g., using one or more of processors 710*a*-710*n*) can apply one or more rules to each preliminary output to generate a constrained output. For example, applying the rules can involve parsing the preliminary output to identify one or more response components, evaluating each response component against user-specific constraints and user-specific preferences as logical predicates, and modifying at least one response component that violates at least one rule while preserving compliant response components. The one or more rules can enforce compliance with user-specific constraints and user-specific preferences stored in a rules database associated with the user.

At step 410, the response system 160 (e.g., using one or more of processors 710*a*-710*n*) can generate a citation linking each constrained output to a source identifier associated with the knowledge element. For example, the system can associate each constrained output with metadata identifying the specific knowledge element from which the output was derived. The citation mechanism enables traceability between generated outputs and their underlying sources, supporting explainability and auditability of the response generation process.

At step 412, the response system 160 (e.g., using one or more of processors 710*a*-710*n*) can aggregate each constrained output and each citation for each knowledge element of the plurality of knowledge elements to generate a composite response. For example, the system can combine the constrained outputs derived from multiple knowledge elements into a unified response structure, along with the corresponding citations that link each portion of the composite response to its source. The aggregation process can organize the constrained outputs according to relevance, priority, or other criteria to produce a coherent composite response.

At step 414, the response system 160 (e.g., using one or more of processors 710*a*-710*n*) can transmit, to the user interface, the composite response and a plurality of citations corresponding to the plurality of knowledge elements. For example, the system can format the composite response and citations for presentation via the user interface and transmit the formatted output through a secure communication channel. The transmitted output enables the user to review the response along with the citations that identify the source materials underlying each portion of the response, thereby providing transparency into the basis for the generated responses.

Exemplary Machine Learning Model

Figure 5:
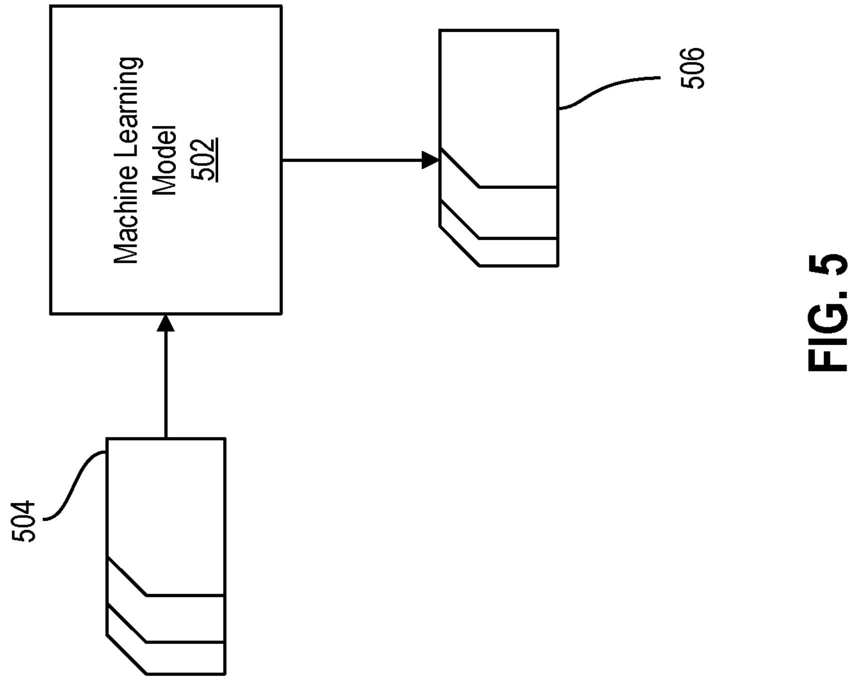
FIG. 5 illustrates an exemplary machine learning model, in accordance with one or more implementations of this disclosure.

FIG. 5 illustrates an exemplary machine learning model 502, in accordance with one or more implementations of this disclosure. The machine learning model 502 can be an artificial intelligence (AI) model, such as a large language model (LLM), a generative model, or another model. According to some examples, the machine learning model can be any model, such as a model for generating constrained outputs based on proprietary knowledge elements. In some implementations, the machine learning model 502 can be trained to intake input 504, including an input query and knowledge elements retrieved from a proprietary knowledge corpus. As a result of inputting the input 504 into the machine learning model 502, the machine learning model 502 can then output an output 506. As described herein, the input data can include data such as frameworks, methodologies, constraints, user-specific rules, or user-specific preferences. In particular, the machine learning model 502 can receive query-related data and knowledge elements for response generation and constrained output optimization.

For example, the output 506 can include preliminary outputs including response components based on the input query and knowledge elements. Furthermore, as described, the machine learning model 502 can be configured to output detailed response explanations and citation data linking outputs to source identifiers associated with knowledge elements. The machine learning model 502 can be trained on a training dataset containing a plurality of knowledge element examples and response outcomes, such as verified response results and compliance patterns that were identified by operators. For example, the machine learning model 502 is described in relation to FIG. 5 herein.

The output parameters can be fed back to the machine learning model 502 as input to train the machine learning model 502 (e.g., alone or in conjunction with user indications of the accuracy of outputs, labels associated with the inputs, or other reference feedback information). The machine learning model 502 can update its configurations (e.g., weights, biases, or other parameters) based on the assessment of its prediction and reference feedback information (e.g., user indication of accuracy, reference labels, or other information). Connection weights can be adjusted, for example, if the machine learning model 502 is a neural network to reconcile differences between the neural network's prediction and the reference feedback regarding response effectiveness (e.g., accuracy versus relevance optimization strategies for knowledge element retrieval versus constraint enforcement).

One or more neurons of the neural network can require that their respective errors be sent backward through the neural network to facilitate the update process (e.g., backpropagation of error). Updates to the connection weights can, for example, be reflective of the magnitude of error propagated backward after a forward pass has been completed. In this way, for example, the machine learning model can be trained to generate better predictions.

In some implementations, the machine learning model 502 can include an artificial neural network. In such implementations, the machine learning model 502 can include an input layer and one or more hidden layers. Each neural unit of the machine learning model 502 can be connected to one or more other neural units of the machine learning model 502. Such connections can be excitatory or inhibitory in their effect on the activation state of connected neural units. Each individual neural unit can have a summation function that combines the values of all of its inputs together. Each connection (or the neural unit itself) can have a threshold function that a signal must surpass before it propagates to other neural units. The machine learning model 502 can be self-learning or trained, rather than explicitly programmed, and can perform significantly better in certain areas of problem-solving as compared to computer programs that do not use machine learning. During training, an output layer of the machine learning model 502 can correspond to a response strategy or constraint compliance classification of the machine learning model 502, and an input known to correspond to that response strategy or classification can be input into an input layer of the machine learning model 502 during training. During testing, an input without a known response strategy or classification can be input into the input layer, and a determined strategy or classification can be output.

The machine learning model 502 can include embedding layers in which each feature of a vector is converted into a dense vector representation. These dense vector representations for each feature can be pooled at one or more subsequent layers to convert the set of embedding vectors into a single vector. The machine learning model 502 can be structured as a factorization machine model. The machine learning model 502 can be a nonlinear model or supervised learning model that can perform response generation or constraint compliance classification. For example, the machine learning model 502 can be a general-purpose supervised learning algorithm that the response system uses for both constrained output generation and knowledge element retrieval optimization. In some implementations, the machine learning model 502 can include a Bayesian model configured to perform variational inference on the graph or vector.

Transformer for Neural Network

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer"), and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks, and there can be more complex neural network designs that include feedback connections, skip connections, or other such possible connections between neurons or layers, which are not discussed in detail here.

A deep neural network (DNN) is a type of neural network that has multiple layers or a large number of neurons. The term "DNN" can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, image recognition, object classification, etc.) in order to improve the accuracy of outputs (e.g., more accurate predictions) as compared, for example, with models with fewer layers. In the present disclosure, the term "machine learning-based model" or, more simply, "machine learning model" can be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset can be a collection of text documents, referred to as a "text corpus" (or simply referred to as a "corpus"). The corpus can represent a language domain (e.g., a single language) or a subject domain (e.g., scientific papers) or can encompass another domain or domains, be they larger or smaller than a single language or subject domain. For example, a relatively large, multilingual, and non-subject-specific corpus can be created by extracting text from online web pages or publicly available social media posts. Training data can be annotated with ground truth labels (e.g., each data entry in the training dataset can be paired with a label) or can be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding machine learning model input (e.g., in the case of an autoencoder) or can be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters can be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model is typically to minimize a loss function or maximize a reward function.

The training data can be a subset of a larger dataset. For example, a dataset can be split into three mutually exclusive subsets: a training set, a validation (or cross-validation) set, and a testing set. The three subsets of data can be used sequentially during machine learning model training. For example, the training set can be first used to train one or more machine learning models, e.g., each machine learning model having a particular architecture, having a particular training procedure, being describable by a set of model hyperparameters, or otherwise being varied from the other of the one or more machine learning models. The validation (or cross-validation) set can then be used as input data into the trained machine learning models to, e.g., measure the performance of the trained machine learning models or compare performance between them. Where hyperparameters are used, a new set of hyperparameters can be determined based on the measured performance of one or more of the trained machine learning models, and the first step of training (e.g., with the training set) can begin again on a different machine learning model described by the new set of determined hyperparameters. In this way, these steps can be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) can begin. The output generated from the testing set can be compared with the corresponding desired target values to give a final assessment of the trained machine learning model's accuracy. Other segmentations of the larger dataset or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model can be used. The process of updating (or learning) the parameters over many iterations is referred to as training. Training can be carried out iteratively until a convergence condition is met (e.g., a predefined maximum number of iterations has been performed, or the value outputted by the machine learning model is sufficiently converged with the desired target value), after which the machine learning model is considered to be sufficiently trained. The values of the learned parameters can then be fixed, and the machine learning model can be deployed to generate output in real-world applications (also referred to as "inference").

In some examples, a trained machine learning model can be fine-tuned, meaning that the values of the learned parameters can be adjusted slightly in order for the machine learning model to better model a specific task. Fine-tuning of a machine learning model typically involves further training the machine learning model on a number of data samples (which can be smaller in number/cardinality than those used to train the model initially) that closely target the specific task. For example, a machine learning model for generating natural language, e.g., for responses to user queries, or constrained outputs that have been trained generically on publicly available text corpora can be, e.g., fine-tuned by further training using specific training samples. The specific training samples can be used to generate language in a certain style or in a certain format. For example, the machine learning model can be trained to generate a response having a particular style and structure with a given topic.

Some concepts in machine learning-based language models are now discussed. It can be noted that while the term "language model" has been commonly used to refer to a machine learning-based language model, there can exist non-machine learning language models. In the present disclosure, the term "language model" can refer to a machine learning-based language model (e.g., a language model that is implemented using a neural network or other machine learning architecture) unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence based on probabilities. A language model can contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure can be applicable to any machine learning-based language model, including language models based on other neural network architectures, such as RNN-based language models.

Figure 6:
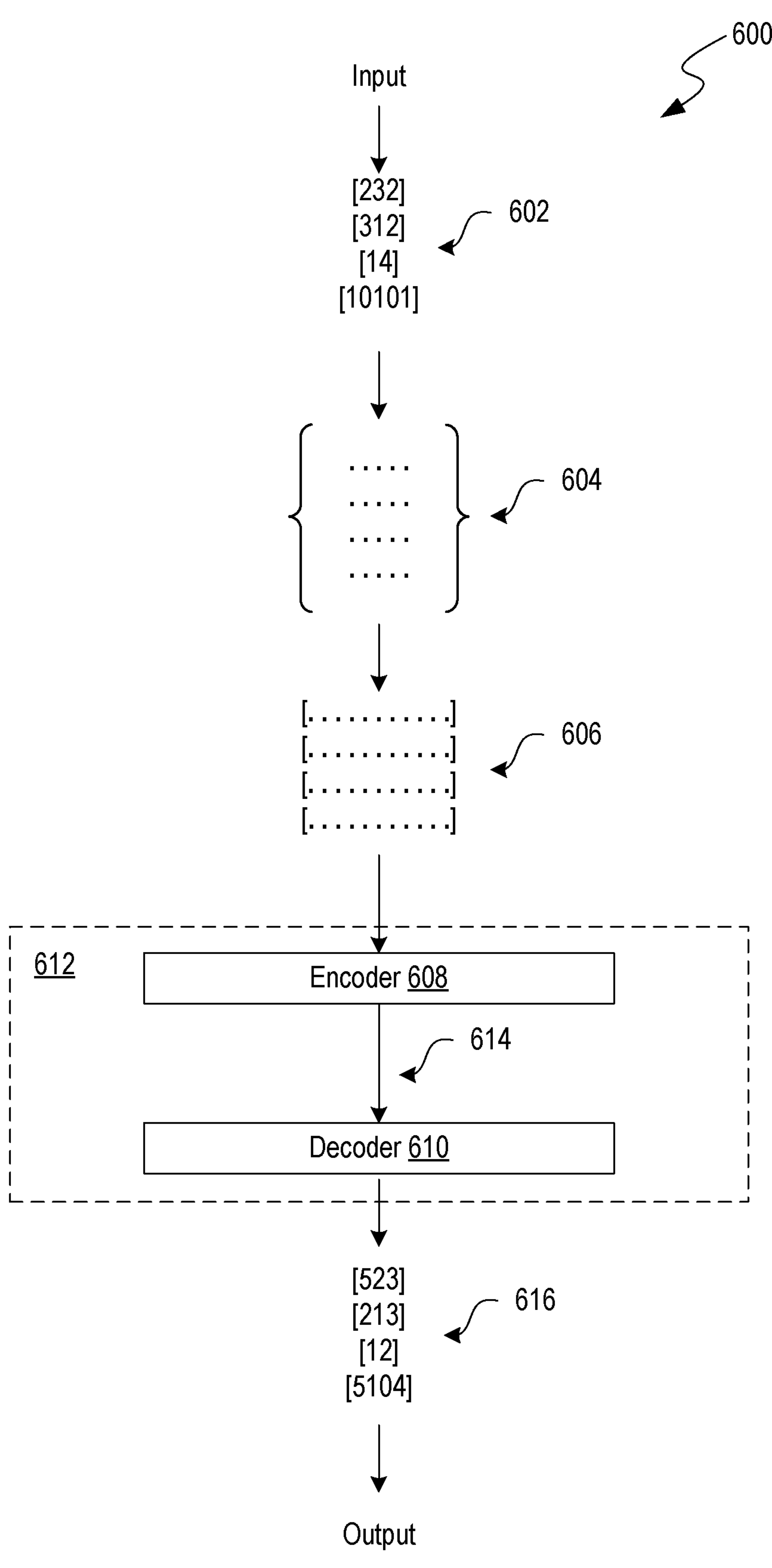
FIG. 6 is a block diagram of an example transformer, in accordance with one or more implementations of this disclosure.

FIG. 6 is a block diagram 600 of an example transformer, in accordance with one or more implementations of this disclosure. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure can be applicable to any machine learning-based language model, including language models based on other neural network architectures, such as RNN-based language models.

The transformer 612 includes an encoder 608 (which can include one or more encoder layers/blocks connected in series) and a decoder 610 (which can include one or more decoder layers/blocks connected in series). Generally, the encoder 608 and the decoder 610 each include multiple neural network layers, at least one of which can be a self-attention layer. The parameters of the neural network layers can be referred to as the parameters of the language model.

The transformer 612 can be trained to perform certain functions on a natural language input. Examples of the functions include summarizing existing content, brainstorming ideas, writing a rough draft, fixing spelling and grammar, and translating content. Summarizing can include extracting key points or themes from existing content in a high-level summary. Brainstorming ideas can include generating a list of ideas based on provided input. For example, the machine learning model can generate a list of recommendations based on retrieved knowledge elements from a proprietary knowledge corpus. Writing a rough draft can include generating writing in a particular style that can be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 612 is trained to perform certain functions on input formats other than natural language input. For example, the input can include objects, images, audio content, video content, or a combination thereof.

The transformer 612 can be trained on a text corpus that is labeled (e.g., annotated to indicate verbs, nouns) or unlabeled. LLMs can be trained on a large unlabeled corpus. The term "language model," as used herein, can include a machine learning-based language model (e.g., a language model that is implemented using a neural network or other machine learning architecture) unless stated otherwise. Some LLMs can be trained on a large multi-language, multi-domain corpus to enable the model to be versatile at a variety of language-based tasks, such as generative tasks (e.g., generating human-like natural language responses to natural language input).

FIG. 6 illustrates how the transformer 612 can process textual input data. Input to a language model (whether transformer-based or otherwise) typically is in the form of natural language that can be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list or a paragraph), an [EOT] token can be another special token that indicates the end of the textual sequence, other tokens can provide formatting information, etc.

As shown in the block diagram 600, a short sequence of tokens 602 corresponding to the input text is illustrated as input to the transformer 612. Tokenization of the text sequence into the tokens 602 can be performed by some pre-processing tokenization module, such as, for example, a byte-pair encoding tokenizer (the "pre" referring to the tokenization occurring prior to the processing of the tokenized input by the LLM), which is not shown in FIG. 6 for brevity. In general, the token sequence that is inputted to the transformer 612 can be of any length up to a maximum length defined based on the dimensions of the transformer 612. Each token 602 in the token sequence is converted into an embedding 606 (also referred to as an "embedding vector").

An embedding 606 is a learned numerical representation (such as, for example, a vector) of a token that captures some semantic meaning of the text segment represented by the token. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained machine learning model can be used to convert the token 602 into an embedding 606. In particular, another trained machine learning model can be used to convert the token 602 into an embedding 606 in a way that encodes additional information into the embedding 606 (e.g., a trained machine learning model can encode positional information about the position of the token 602 in the text sequence into the embedding 606). In some implementations, the numerical value of the token 602 can be used to look up the corresponding embedding in an embedding matrix 604, which can be learned during training of the transformer 612.

The generated embeddings, e.g., such as the embedding 606, are input into the encoder 608. The encoder 608 serves to encode the embedding 606 into feature vectors 614 that represent the latent features of the embedding 606. The encoder 608 can encode positional information (i.e., information about the sequence of the input) in the feature vectors 614. The feature vectors 614 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 614, that can be generated by the encoder 608 can be referred to as a latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 can generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some implementations, the input provided to the transformer 612 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include an input query and knowledge elements retrieved from a proprietary knowledge corpus, and the output can include a preliminary output indicating response components based on the knowledge elements. In other examples, the input provided to the transformer includes a question or a request to generate text. The output can include a response to the question, text associated with the request, or a list of ideas associated with the request. For example, the input can include a request received through a user interface associated with an entity, and the output can include a preliminary output with response components that can be evaluated against user-specific constraints and user-specific preferences. As another example, the input can include a request to generate responses based on entity-specific frameworks, methodologies, or constraints, and the output can include a list of relevant response components with citations linking to source identifiers.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,047 input tokens), and is able to generate a large number of tokens as output (e.g., up to 2,047 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an application programming interface (API)). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive or can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred implementations, it is to be understood that such detail is solely for that purpose and that the invention is not limited to the disclosed implementations but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

The above-described implementations of the present disclosure are presented for purposes of illustration, not of limitation, and the present disclosure is limited only by the claims that follow. Furthermore, it should be noted that the features and limitations described in any one implementation can be applied to any other implementation herein, and flowcharts or examples relating to one implementation can be combined with any other implementation in a suitable manner, done in different orders, or done in parallel. In addition, the systems and methods described herein can be performed in real time. It should also be noted that the systems or methods described above can be applied to, or used in accordance with, other systems or methods.

Computing System

FIG. 7 shows an example computing system that can be used in accordance with some implementations of this disclosure. In some instances, computing system 700 is referred to as a computer system 700. A person skilled in the art can understand that those terms can be used interchangeably. The components of FIG. 7 can be used to perform some or all operations discussed in relation to FIGS. 1-7. Furthermore, various portions of the systems and methods described herein can include or be executed on one or more computer systems similar to computing system 700. Further, processes and modules described herein can be executed by one or more processing systems similar to that of computing system 700.

Computing system 700 can include one or more processors (e.g., processors 710*a*-710*n*) coupled to system memory 720, an input/output (I/O) device interface 730, and a network interface 740 via an I/O interface 750. A processor can include a single processor or a plurality of processors (e.g., distributed processors). A processor can be any suitable processor capable of executing or otherwise performing instructions. A processor can include a central processing unit (CPU) that carries out program instructions to perform the arithmetical, logical, and I/O operations of computing system 700. A processor can execute code (e.g., processor firmware, a protocol stack, a database management system, an operating system, or a combination thereof) that creates an execution environment for program instructions.

A processor can include a programmable processor. A processor can include general or special-purpose microprocessors. A processor can receive instructions and data from a memory (e.g., system memory 720). Computing system 700 can be a uni-processor system including one processor (e.g., processor 710*a*) or a multiprocessor system including any number of suitable processors (e.g., processors 710*a*-710*n*). Multiple processors can be employed to provide for parallel or sequential execution of one or more portions of the techniques described herein. Processes, such as logic flows, described herein can be performed by one or more programmable processors executing one or more computer programs to perform functions by operating on input data and generating corresponding output. Processes described herein can be performed by, and apparatus can also be implemented as, special-purpose logic circuitry, e.g., an FPGA (field-programmable gate array) or an ASIC (application-specific integrated circuit). Computing system 700 can include a plurality of computing devices (e.g., distributed computer systems) to implement various processing functions.

I/O device interface 730 can provide an interface for connection of one or more I/O devices 760 to computer system 700. I/O devices can include devices that receive input (e.g., from a user) or output information (e.g., to a user). I/O devices 760 can include, for example, a graphical user interface (UI) presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 can be connected to computer system 700 through a wired or wireless connection. I/O devices 760 can be connected to computer system 700 from a remote location. I/O devices 760 located on remote computer systems, for example, can be connected to computer system 700 via a network and network interface 740.

The I/O device interface 730 and I/O devices 760 can be used to enable manipulation of the response system as well. For example, the user is able to use I/O devices such as a keyboard and touchpad to indicate specific selections for response parameters, adjust values for constraint parameters, select from the history of response results, select specific data records or suitability scores, or the like. Alternatively or additionally, the user can use their voice to indicate specific response preferences, specific multimodal output configurations, or the like via the voice recognition device or microphones.

Network interface 740 can include a network adapter that provides for connection of computer system 700 to a network. Network interface 740 can facilitate data exchange between computer system 700 and other devices connected to the network. Network interface 740 can support wired or wireless communication. The network can include an electronic communication network, such as the internet, a LAN, a WAN, a cellular communications network, or the like.

System memory 720 can be configured to store program instructions 770 or data 780. Program instructions 770 can be executable by a processor (e.g., one or more of processors 710*a*-710*n*) to implement one or more implementations of the present techniques. Program instructions 770 can include modules of computer program instructions for implementing one or more techniques described herein with regard to various processing modules. Program instructions can include a computer program (which in certain forms is known as a program, software, software application, script, or code). A computer program can be written in a programming language, including compiled or interpreted languages, or declarative or procedural languages. A computer program can include a unit suitable for use in a computing environment, including as a stand-alone program, a module, a component, or a subroutine. A computer program can correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one or more computer processors located locally at one site or distributed across multiple remote sites and interconnected by a communication network.

System memory 720 can include a tangible program carrier having program instructions stored thereon. A tangible program carrier can include a non-transitory, computer-readable storage medium. A non-transitory, computer-readable storage medium can include a machine-readable storage device, a machine-readable storage substrate, a memory device, or any combination thereof. A non-transitory, computer-readable storage medium can include non-volatile memory (e.g., flash memory, ROM, PROM, EPROM, EEPROM), volatile memory (e.g., random access memory (RAM), static RAM (SRAM), synchronous dynamic RAM (SDRAM)), bulk storage memory (e.g., CD-ROM, DVD-ROM, hard drives), or the like. System memory 720 can include a non-transitory, computer-readable storage medium that can have program instructions stored thereon that are executable by a computer processor (e.g., one or more of processors 710*a*-710*n*) to cause the subject matter and the functional operations described herein. A memory (e.g., system memory 720) can include a single memory device or a plurality of memory devices (e.g., distributed memory devices).

I/O interface 750 can be configured to coordinate I/O traffic between processors 710*a*-710*n*, system memory 720, network interface 740, I/O devices 760, or other peripheral devices. I/O interface 750 can perform protocol, timing, or other data transformations to convert data signals from one component (e.g., system memory 720) into a format suitable for use by another component (e.g., processors 710*a*-710*n*). I/O interface 750 can include support for devices attached through various types of peripheral buses, such as a variant of the Peripheral Component Interconnect (PCI) bus standard or the Universal Serial Bus (USB) standard.

Implementations of the techniques described herein can be implemented using a single instance of computer system 700 or multiple computer systems 700 configured to host different portions or instances of implementations. Multiple computer systems 700 can provide for parallel or sequential processing/execution of one or more portions of the techniques described herein.

Those skilled in the art will appreciate that computer system 700 is merely illustrative and is not intended to limit the scope of the techniques described herein. Computer system 700 can include any combination of devices or software that can perform or otherwise provide for the performance of the techniques described herein. For example, computer system 700 can include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 700 can also be connected to other devices that are not illustrated or can operate as a stand-alone system. In addition, the functionality provided by the illustrated components can, in some implementations, be combined in fewer components or be distributed in additional components. Similarly, in some implementations, the functionality of some of the illustrated components is not provided, or other additional functionality is available.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can not only include additional elements to those implementations noted above but can also include fewer elements.

These and other changes can be made to the technology in light of the above Detailed Description. While the above description describes certain examples of the technology and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, either in this application or in a continuing application.

We claim:

1. One or more non-transitory, computer-readable storage media comprising instructions recorded thereon, wherein the instructions, when executed by at least one data processor of a system, cause the system to:

receive, via a user interface associated with an entity, an input query relating to a request from a user;

retrieve, from a proprietary knowledge corpus stored in a database, a plurality of knowledge elements responsive to the input query, wherein the plurality of knowledge elements comprises one or more of frameworks, methodologies, or constraints, and wherein the plurality of knowledge elements is specific to the entity;

for each knowledge element of the plurality of knowledge elements:

input, into a large language model (LLM), the input query and the knowledge element to generate a preliminary output, wherein the preliminary output is based on the knowledge element;

apply one or more user-specific rules to the preliminary output to generate a constrained output, the one or more user-specific rules enforcing compliance with user-specific constraints and user-specific preferences, by:

parsing the preliminary output to identify one or more response components, evaluating each response component against the user-specific constraints and the user-specific preferences as logical predicates, and modifying at least one response component that violates at least one user-specific rule while preserving compliant response components; and generate a citation linking the constrained output to a source identifier associated with the knowledge element;

aggregate the constrained output and the citation for each knowledge element of the plurality of knowledge elements to generate a composite response; and transmit, to the user interface, the composite response and a plurality of citations corresponding to the plurality of knowledge elements.

2. The one or more non-transitory, computer-readable storage media of claim 1, wherein the instructions for retrieving the plurality of knowledge elements further cause the system to:

generate a vector representation of the input query;

compare the vector representation to a plurality of stored vector representations corresponding to the plurality of knowledge elements; and select the plurality of knowledge elements based on a similarity threshold.

3. The one or more non-transitory, computer-readable storage media of claim 1, wherein the proprietary knowledge corpus comprises a knowledge graph representing relationships between the one or more of the frameworks, the methodologies, or the constraints, and wherein retrieving the plurality of knowledge elements comprises traversing the knowledge graph to identify connected nodes representing related frameworks, methodologies, or constraints, and wherein the system uses the relationships represented in the knowledge graph to determine contextual relevance of each knowledge element to the input query.

4. The one or more non-transitory, computer-readable storage media of claim 1, wherein the one or more user-specific rules are stored in a rules database associated with the user.

5. The one or more non-transitory, computer-readable storage media of claim 1, wherein the instructions further cause the system to maintain an audit trail linking the constrained output to a version of the knowledge element from which the constrained output was derived.

6. The one or more non-transitory, computer-readable storage media of claim 1, wherein the instructions further cause the system to update the proprietary knowledge corpus, and wherein the instructions for updating the proprietary knowledge corpus further cause the system to maintain a history of changes to the plurality of knowledge elements for regulatory compliance.

7. A method comprising:

receiving, via an input modality, an input query relating to a request;

retrieving, from a proprietary knowledge corpus, a plurality of knowledge elements responsive to the input query, wherein the plurality of knowledge elements comprises one or more of frameworks, methodologies, or constraints;

for each knowledge element of the plurality of knowledge elements:

inputting, into an AI model, the input query and the knowledge element to generate a preliminary output;

applying one or more rules to the preliminary output to generate a constrained output, wherein the one or more rules enforce compliance with one or more constraints; and generating a citation linking the constrained output to a source identifier associated with the knowledge element;

aggregating the constrained output and the citation for each knowledge element of the plurality of knowledge elements to generate a composite response;

adapting the composite response to an output modality corresponding to the input modality, wherein adapting the composite response comprises formatting the composite response for presentation via the output modality; and transmitting, via the output modality, the composite response and a plurality of citations corresponding to the plurality of knowledge elements.

8. The method of claim 7, wherein retrieving the plurality of knowledge elements comprises:

generating a vector representation of the input query;

comparing the vector representation to a plurality of stored vector representations corresponding to the plurality of knowledge elements; and selecting the plurality of knowledge elements based on a similarity threshold.

9. The method of claim 7, wherein the proprietary knowledge corpus comprises a knowledge graph representing relationships between the one or more of the frameworks, the methodologies, or the constraints, and wherein retrieving the plurality of knowledge elements comprises traversing the knowledge graph to identify connected nodes representing related frameworks, methodologies, or constraints, and wherein contextual relevance of each knowledge element to the input query is determined based on the relationships represented in the knowledge graph.

10. The method of claim 7, wherein the one or more rules are stored in a rules database associated with a user.

11. The method of claim 7, further comprising maintaining an audit trail linking the constrained output to a version of the knowledge element from which the constrained output was derived.

12. The method of claim 7, further comprising updating the proprietary knowledge corpus, wherein updating the proprietary knowledge corpus comprises maintaining a history of changes to the plurality of knowledge elements for regulatory compliance.

13. The method of claim 7, wherein applying the one or more rules to the preliminary output to generate the constrained output comprises:

parsing the preliminary output to identify one or more response components;

evaluating each response component against the one or more constraints as logical predicates; and modifying at least one response component that violates at least one rule while preserving compliant response components.

14. A system comprising:

a storage device; and one or more processors communicatively coupled to the storage device storing instructions thereon, that cause the one or more processors to:

receive, via an input modality, an input query relating to a request;

retrieve, from a proprietary knowledge corpus, a plurality of knowledge elements responsive to the input query, wherein the plurality of knowledge elements comprises one or more of frameworks, methodologies, or constraints;

for each knowledge element of the plurality of knowledge elements:

input, into an AI model, the input query and the knowledge element to generate a preliminary output;

apply one or more rules to the preliminary output to generate a constrained output, wherein the one or more rules enforce compliance with one or more constraints; and generate a citation linking the constrained output to a source identifier associated with the knowledge element;

aggregate the constrained output and the citation for each knowledge element of the plurality of knowledge elements to generate a composite response;

adapt the composite response to an output modality corresponding to the input modality, wherein adapting the composite response comprises formatting the composite response for presentation via the output modality; and transmit, via the output modality, the composite response and a plurality of citations corresponding to the plurality of knowledge elements.

15. The system of claim 14, wherein the instructions for retrieving the plurality of knowledge elements further cause the one or more processors to:

generate a vector representation of the input query;

compare the vector representation to a plurality of stored vector representations corresponding to the plurality of knowledge elements; and select the plurality of knowledge elements based on a similarity threshold.

16. The system of claim 14, wherein the proprietary knowledge corpus comprises a knowledge graph representing relationships between the one or more of the frameworks, the methodologies, or the constraints, and wherein retrieving the plurality of knowledge elements comprises traversing the knowledge graph to identify connected nodes representing related frameworks, methodologies, or constraints, and wherein contextual relevance of each knowledge element to the input query is determined based on the relationships represented in the knowledge graph.

17. The system of claim 14, wherein the one or more rules are stored in a rules database associated with a user.

18. The system of claim 14, wherein the instructions further cause the one or more processors to maintain an audit trail linking the constrained output to a version of the knowledge element from which the constrained output was derived.

19. The system of claim 14, wherein the instructions further cause the one or more processors to update the proprietary knowledge corpus, wherein updating the proprietary knowledge corpus comprises maintaining a history of changes to the plurality of knowledge elements for regulatory compliance.

20. The system of claim 14, wherein the instructions for applying the one or more rules to the preliminary output to generate the constrained output further cause the one or more processors to:

parse the preliminary output to identify one or more response components;

evaluate each response component against the one or more constraints as logical predicates; and modify at least one response component that violates at least one rule while preserving compliant response components.

* * * * *